United States Patent [19]

Lis

[11] Patent Number: 5,289,042
[45] Date of Patent: Feb. 22, 1994

[54] WIND OPERATED GENERATOR

[76] Inventor: Edward Lis, 2530 W. Shakespeare, Chicago, Ill. 60647

[21] Appl. No.: 989,649

[22] Filed: Dec. 11, 1992

[51] Int. Cl.$^5$ .......................... F03D 1/02; F03D 11/00
[52] U.S. Cl. ...................................... 290/55; 290/44; 415/60; 415/66; 415/67; 415/68
[58] Field of Search ...................... 290/44, 55; 415/60, 415/64, 66, 67, 68

[56] References Cited

U.S. PATENT DOCUMENTS

| 137,565 | 4/1873 | Park | 415/33 |
|---|---|---|---|
| 174,774 | 3/1876 | Brower et al. | 416/139 |
| 756,372 | 4/1904 | Johnson | 415/43 |
| 1,056,288 | 3/1913 | MacIntosh | 415/66 |
| 3,473,038 | 10/1969 | Hakkarinen | 290/44 |
| 4,111,601 | 9/1978 | Richard | 416/41 |
| 4,779,006 | 10/1988 | Wortham | 290/55 |
| 4,792,700 | 12/1988 | Ammons | 290/55 |
| 4,818,890 | 4/1989 | Mose et al. | 290/52 |
| 4,871,923 | 10/1989 | Scholz et al. | 290/55 |
| 4,894,554 | 1/1990 | Farmer | 290/55 |
| 4,906,060 | 3/1990 | Claude | 290/44 |
| 4,917,329 | 4/1990 | Vollmerhausen | 244/2 |
| 4,917,335 | 4/1990 | Tidman | 244/130 |
| 4,935,639 | 6/1990 | Yeh et al. | 290/55 |
| 4,966,525 | 10/1992 | Nielsen | 416/9 |
| 4,994,684 | 2/1991 | Lauw et al. | 290/400 |
| 5,057,696 | 10/1991 | Thomas | 290/44 |
| 5,075,564 | 12/1991 | Hickey | 290/55 |
| 5,083,039 | 1/1992 | Richardson et al. | 290/44 |

FOREIGN PATENT DOCUMENTS 161996 12/1980 Japan ....................................... 415/60

Primary Examiner—A. D. Pellinen
Assistant Examiner—Robert Lloyd Hoover
Attorney, Agent, or Firm—Dvorak and Traub

[57] ABSTRACT

The wind operated generator has a housing having a shaft opening for receiving an outer turbine tube shaft extending longitudinally through the shaft opening. An inner turbine has an inner tube shaft extending longitudinally through the outer tube shaft. Roller means are provided for supporting the outer and inner tube shafts within the housing. Roller ring means are interposed between the inner and outer tube shafts and the housing for limiting axial movements between the outer and inner tube shafts with respect to the housing. Magnetic means are carried on outer and inner tube shafts with corresponding juxtaposed electromagnetic pick-up means to provide an electrical output, the inner turbine means having scroll-type vanes directing a coplanar flow of air to actuate the outer turbine having open-ended box-type vanes.

12 Claims, 4 Drawing Sheets

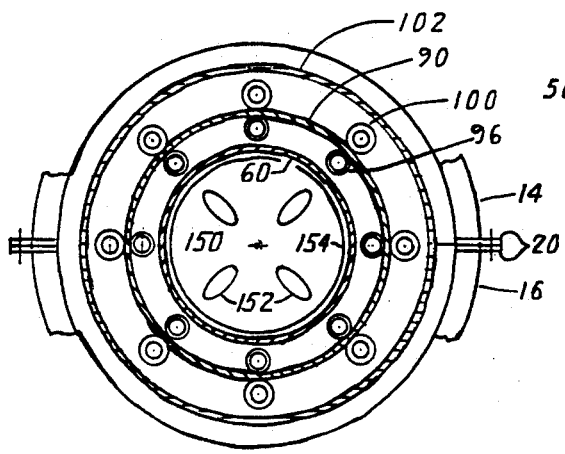
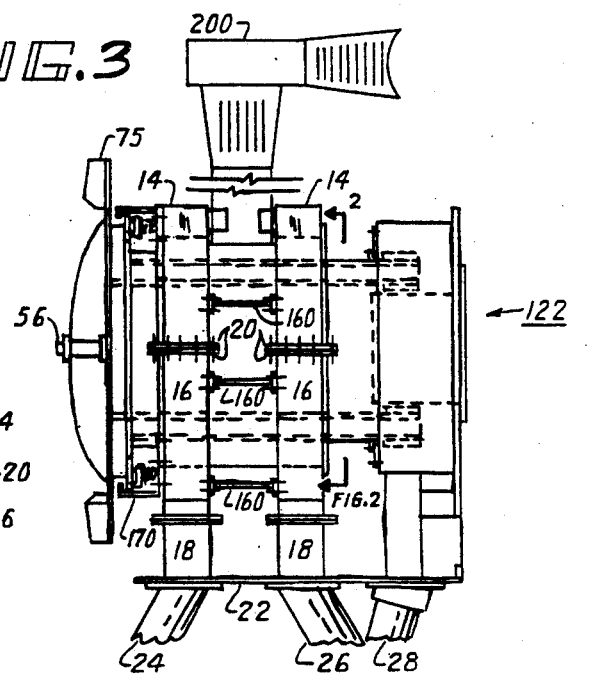
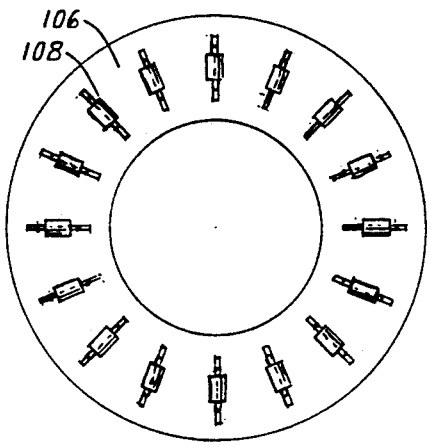

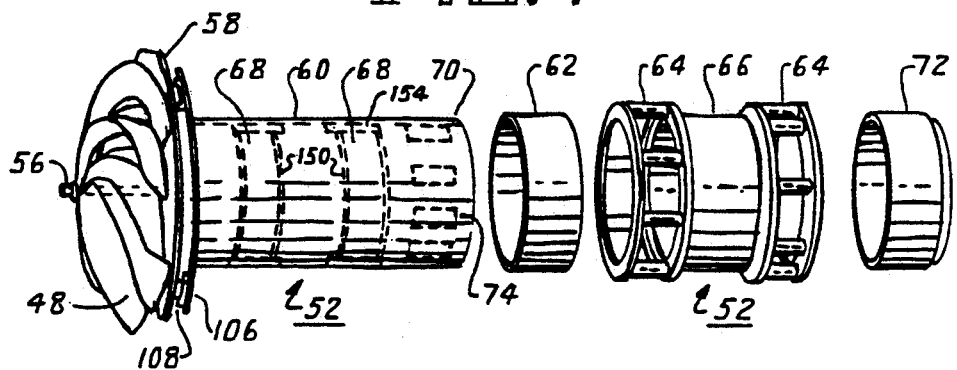
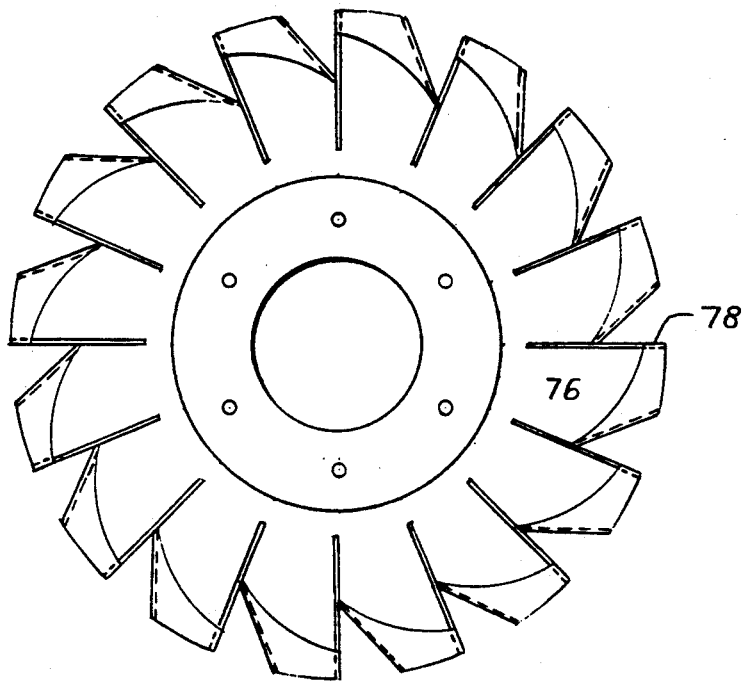
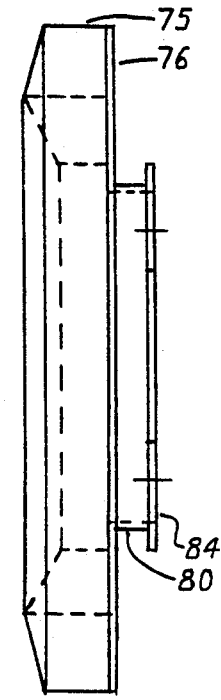
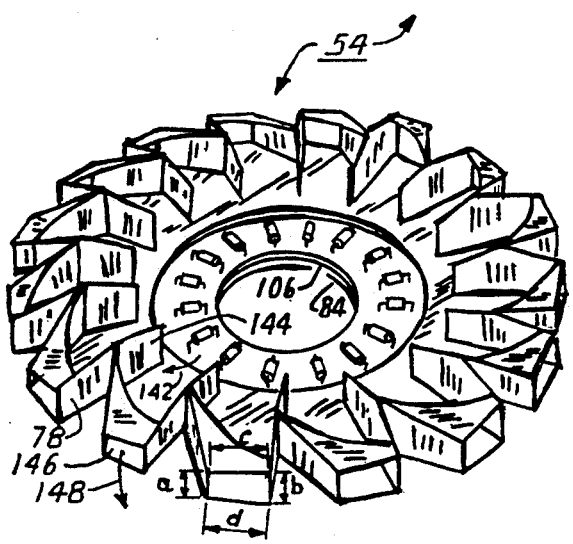

5,289,042

WIND OPERATED GENERATOR

BACKGROUND OF THE INVENTION

1. Field of the Invention

This invention relates to a wind operated generator, and more particularly to an improved wind operated generator, utilizing dual turbines in the operation of the generator.

2. Description of the Prior Art

Wind operated generators and motors are broadly old and well-known in the prior art. Wind operated generators utilizing counter-rotating propellers for increasing the derived speed and power of the electrical output from the generator have been used before. Referring to U.S. Pat. No. 4,039,848, there is described a wind operated generator utilizing a pair of propellers rotating on a common shaft but displaced from each other and occupying separate planes. Counter-rotating propellers actuate a DC generator mounted between the propellers and carried on a single shaft. The propellers and generator structure are mounted on concentric shafts supported in a positive drive structure in which the shafts are tied together through a gearing to ensure positive starting and counter-rotation of the propellers.

One of the disadvantages of this known apparatus is that it uses a DC generator wherein electric output is taken off by means of brushes. Another disadvantage is the use of a direct gearing system driven by one of the propellers to add power to the rotation of the generator. Also, a further disadvantage is in the complex arrangement of the electrical wiring to conduct electrical output through rotating shafts and brushes or slip rings. All this points up the fact that some of the power is lost due to frictional problems created in the mechanical system employed in the generator.

SUMMARY OF THE INVENTION

The foregoing disadvantages are overcome with the present wind operated generator using a pair of coaxial tube shafts. One end of each tube shaft is provided with a turbine, and the other end of each tube shaft is provided with magnetic elements. The inner tube shaft has a turbine with scroll (a) vanes, and the outer tube shaft is provided with a turbine (b) having open-ended box-type vanes, wherein the scroll-type turbine directs a stream of air against the box-type vanes to effect counter-rotation of the box-type turbine. An electromagnetic pick-up means is provided at the other ends of the inner and outer tube shafts juxtaposed to the magnetic elements to achieve an electrical output without brushes or slip rings. It should be noted that the scroll-type turbines and the open-ended box-type turbine are located in a single plane to achieve emission of wind from the inner turbine onto the outer concentrically located box-type turbine.

The object of the invention is to provide a more efficient generator which is achieved by reducing frictional losses due to use of mechanical-driven systems and losses due to use of brushes or slip rings.

Another object of the invention is to provide a wind operated generator having concentrically located tube shafts supporting turbines wherein the output of each turbine is added to the total without using interconnecting gearing or other mechanical systems.

Another object of the invention is to provide a wind operated generator having concentrically located turbines rotating in a single plane and provided with individual tube shafts.

A still further object of the invention is to provide a wind operated generator which has an electrical output developed by electromagnetic means.

The wind operated generator has a housing means provided with a tube shaft opening for receiving an outer turbine means having a shaft extending through the shaft opening and an inner turbine means coaxially and coplanarly arranged with respect to the outer turbine means for achieving counter-rotation between the turbine means. Roller means are utilized for supporting the inner and outer turbine means with respect to each other and with respect to the housing. Magnetic means are supported by the inner and outer turbine means to cooperate with electromagnetic pick-up means juxtaposed to the magnetic means to provide an electrical output. Roller ring means are interposed axially between the inner and outer turbine means and the housing for limiting axial movement along longitudinal axes of the inner and outer turbine means. The inner turbine means directs a coplanar flow of air to actuate the outer turbine means to rotate counter to the rotation of the inner turbine means.

The inner turbine means comprises an inner tube shaft, a turbine being secured to one end of the tube shaft, and the magnetic means being mounted on the other end of the tube shaft. Similarly, the outer turbine means has an outer tube shaft, a turbine secured to one end of the tube shaft, and magnetic means being mounted on the other end of the tube shaft. The inner turbine means includes a turbine provide with spiral vanes, and the outer turbine means includes a turbine having open-ended box vanes encompassing the spiral vanes. Roller means are provided to support the inner and outer turbine means, including at least two pairs of roller cages, wherein each roller cage has a plurality of rollers, one pair of roller cages being secured to the housing and adapted to provide external support to the outer turbine means, while the other pair of cages are secured to the outer periphery of the inner turbine means. A roller ring means has at least two ring plates, each ring plate having a plurality of rollers, a plurality of brackets for supporting the rollers outwardly of said ring plate, the rollers being aligned radially on the ring plate. The magnetic means comprise one set of spaced magnets externally supported at one end of the outer turbine means, and the other set of spaced magnets internally supported at one end of the inner turbine means. The electromagnetic pick-up means comprises a plurality of coils spaced about the periphery of one end of the outer turbine means, and a plurality of coils spaced in the interior of one end of the inner turbine means. The electromagnetic pick-up means is mounted on a support plate which has brackets circularly mounted for supporting the electric coils spaced about the periphery of the outer turbine means and a cylinder having one end peripherally supporting the electric coils associated with the inner turbine means.

The wind operated generator is mounted on a rotatable base which supports the housing, including a pedestal having mounted on its upper surface, a circular track, the rotatable base having attached to its bottom a number of grooved rollers which are adapted to roll on the circular track, and means for rotatably securing the base to the other stationary pedestal. The wind operated generator is also provided with a vane structure secured to the housing for directing the inner and outer turbine means into the direction of the wind.

The wind operated generator has a split housing means which may comprise lower housing firm collar supports with spacers between them and upper housing caps or clip-dog supports all provided with a tube shaft opening to receive an outer turbine means having an outer tube shaft extending longitudinally through the shaft opening, the inner turbine means having an inner tube shaft extending coaxially through the outer tube shaft. Roller means are provided for supporting the outer and the inner tube shafts within the housing, and roller ring means are disposed between the inner and outer turbine means and the housing means for limiting axial movements between the outer and inner turbine means with respect to the housing means. Magnetic means are carried on one end of each of the outer and inner turbine means, the magnetic means being associated with electromagnetic pick-up means juxtaposed to the magnetic means mounted on the outer and inner turbine means to provide an electrical output. The inner turbine means functions to direct a coplanar flow of air to actuate the outer turbine means to rotate counter to the rotation of the inner turbine means. The inner turbine means has a turbine with scroll-type vanes, and the outer turbine means has a turbine provided with open-ended box-type vanes. As the wind applies a pressure to the inner turbine means, flow of air moves along the scroll-type vanes and exits in a plane which is perpendicular to the direction of the wind, and then proceeds to apply a force on the open-ended box-type vanes to provide counter-rotation of the outer turbine means. The open-ended box-type vanes may be propelled through the front axial wind acting by blowing at its surface similarly as the scroll-type vanes (as a result of or independent from the force of wind exiting the scroll-type vanes). In one embodiment, air exits through slanted construction upper fin box-type vanes. See FIG. 9 where a<b. Air may also exit through slanted construction side wall of vanes. See FIG. 9 where c<d.

BRIEF DESCRIPTION OF THE DRAWINGS

The invention will now be described in reference to the accompanying drawings, wherein:

FIG. 2 is a sectional view along the lines 2—2 of FIG. 1;

FIG. 3 is a side view of the invention including the housing support assembly unit;

FIG. 4 is a side view of an inner scroll-type turbine assembly;

FIG. 5 is a side view of a ring roller assembly;

FIG. 6 is a plane view of the ring roller assembly;

FIG. 7 is an exploded view of the inner turbine assembly;

FIG. 8 is an end view of an outer turbine assembly;

FIG. 8A is a side view of an outer turbine assembly;

FIG. 9 is a perspective view of the outer turbine assembly; and

PREFERRED EMBODIMENT OF THE INVENTION

Figure 1:
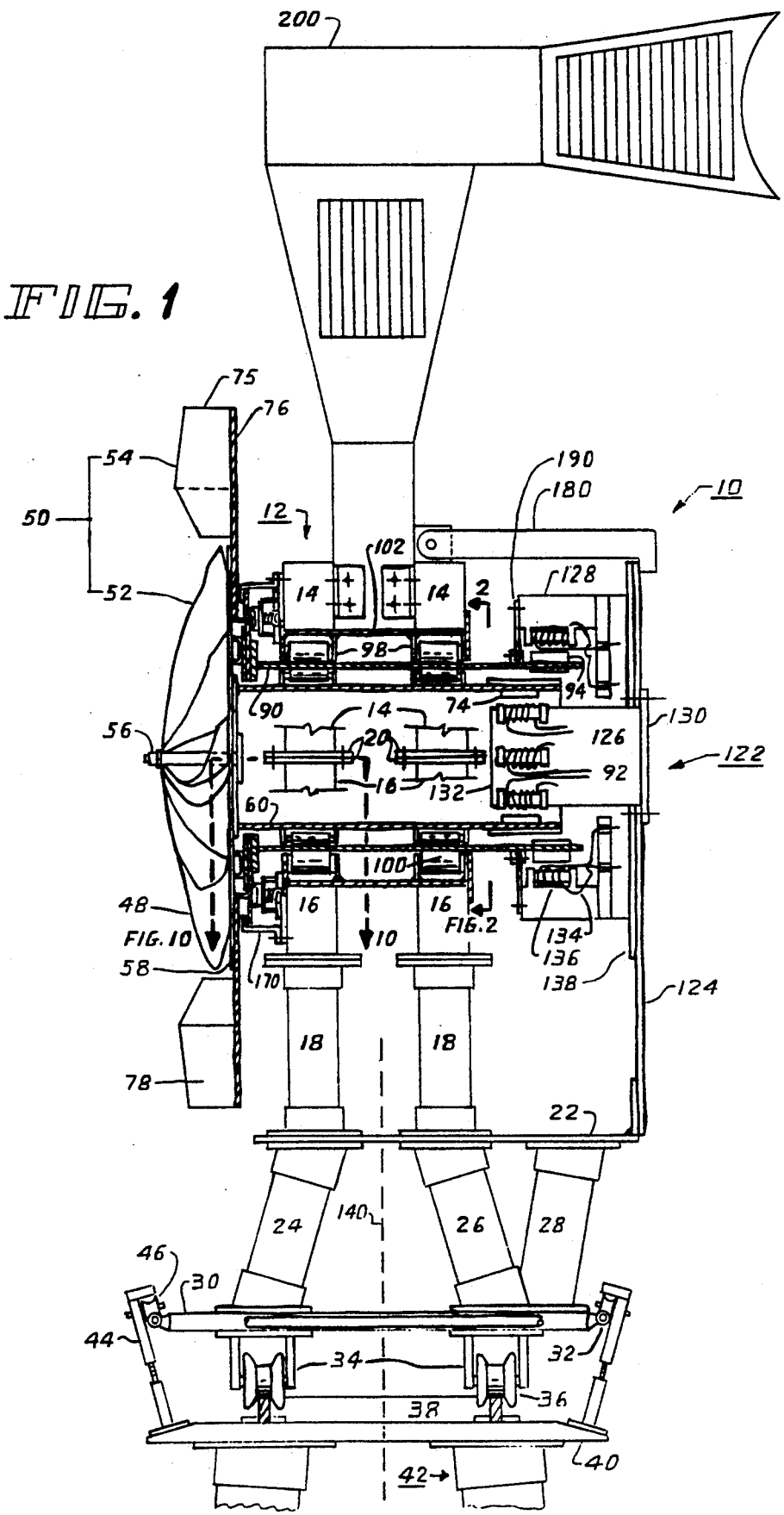
FIG. 1 shows a partial cross-sectional view of a wind operated generator.

Referring to FIG. 1, a wind operated generator 10 comprises a housing 12 having top end caps or clip-dogs 14 and two bottom firm collars 16 supported on four uprights 18 which are secured to a platform 22 which in turn is supported by five uprights 24, 26, and 28, which in turn are secured on a circular base 30 which has a periphery defined by a ring 32. A vane structure 200 secured to the housing that directs the inner and outer turbine means into the eye of the wind. The circular base 30 has a number of brackets 34 provided with rollers 36 adapted to roll on a circular track 38 secured on a support 40 mounted on four legs 42 which can be mounted on a roof of a housing structure or independent light pipe structure at places of good wind access. The support 40 is provided with angled brackets 44 which are provided with rollers 46 engaging the ring 32, thereby permitting rotational movement of the wind operated generator 10 whenever it is aligned into the wind by a vane structure 48.

The housing 12 supports a turbine means 50 comprising an inner turbine assembly 52 and an outer turbine assembly 54. The inner turbine assembly 52 is best viewed in FIGS. 4 and 7, wherein the assembly includes an inner turbine 56 having a number of serial vanes 48 arranged in a pin-wheel fashion supported on a plate 58 secured to one end of a tube shaft 60 made of suitable material such as aluminum adapted to receive a spacer 62, a roller cage 64, a spacer 66, and a roller cage 64, an end 70 adapted to receive a collar made from a plastic, rubber or diamagnetic structured assembly material and supporting on its interior a number of circularly spaced magnets 74.

Figure 10:
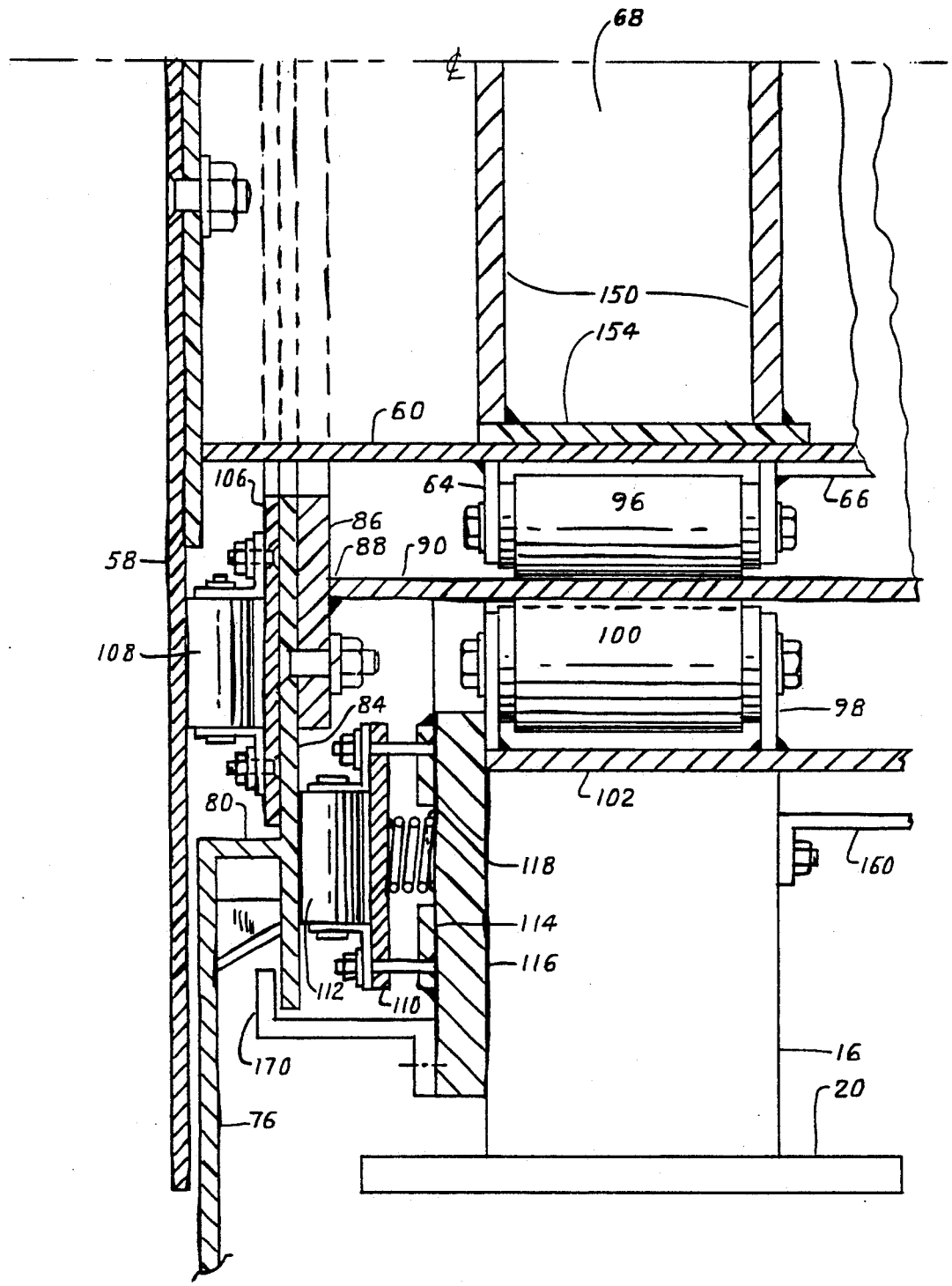
FIG. 10 is an enlarged sectional view along the lines 10—10 of FIG. 3.

The outer turbine assembly 54 comprises a ring plate 76 supporting a plurality of open-ended box vanes 78 arranged circularly on the box plate 76, the box vanes 78 being intercoupled with each other as best viewed in FIG. 9. Referring to FIG. 10, the ring plate 76 has an inner diameter 80 merging with ring plate 84 which is secured to a flange 86 which is secured to an end 88 of an outer tube shaft 90 which concentrically encircles the inner tube shaft 60. Back lash supports 170 prevent outward movement of the vane assemblies. An outer end 92 of the tube shaft 90 supports a plurality of circularly arranged magnets 94 as best shown in FIG. 1.

The inner tube shaft 60 and the outer tube shaft 90 are supported with respect to each other in the housing 12 by a number of roller cages. For example, inner tube shaft 60 is supported by a two roller cages 64, partly, as shown in FIG. 10, the roller cage 64 having a plurality of circumferentially spaced rollers 96. As shown in FIG. 1, and also in FIG. 10, the outer tube shaft 90 is encircled by a pair of roller cages 98 provided with rollers 100. The roller cages 98 are secured to an inner wall 102 of the housing 12.

Facing the turbine means 50 in FIG. 1, vanes 48 are angularly sloped to provide rotary motion for the tube shaft 60 in a counterclockwise direction, while the box vanes 78 have sloping surfaces causing the outer turbine 75 to rotate in a clockwise direction. It is evident that wind pressure will result in interacting forces generated between the inner turbine assembly 52 and outer turbine assembly 54.

Referring to FIG. 3, spacers 160 are illustrated. The spacers serve to position and support the collars 14 and 16.

Referring to FIG. 9, the outer turbine 75 is provided with a roller ring plate 201 which, as particularly shown in FIGS. 5 and 6, is provided with rollers 108 circularly spaced along the roller ring plate 106. As shown in FIG. 10, the ring plate 106 is secured to a ring plate 84 associated with the ring plate 76 of the outer turbine assembly 54. When assembled, the plate 58 of the inner turbine 56 will abut the rollers 108. Referring to FIG. 10, a similar arrangement is made to oppose the forces developed on the outer turbine 75. A ring plate 110, similar to the ring plate 106 shown in FIG. 6 is provided with rollers 112 supported on the ring plate 110 which is fastened by bolts 114 to housing member 116. Interposed between the ring plate 110 and the housing member 116 is a spring 118 to permit the ring plate 110 to slidably move along the bolts 114 in the event of extreme wind pressure momentarily due to a sudden burst.

As previously described, the outer end 92 of the outer tube shaft 90 is provided with magnets 94, and the end 70 of the inner tube shaft 60 is provided with the magnets 74. Associated with the magnets is an electro-magnetic pick-up means 122 which comprises a plate member 124 which supports an inner pick-up unit 126 and an outer pick-up unit 128. The inner pick-up unit 126 is in the form of a cylinder 130 made of non-magnetic material and having coils 132 juxtaposed in reference to the magnets 74. The outer pick-up unit 128 comprises a plurality of coils 134 supported on a plurality of brackets 136 which are circularly spaced on a support plate 138 which is secured to the plate member 124. The leads of the coils 132 and 134 can be combined in any desired combination and then led out centrally of the generator 10 along the axis 140.

As the inner turbine 56, as shown in FIG. 7, rotates in a counterclockwise direction, in reference to the outer turbine 75, as shown in FIG. 9, the air leaving the spiral vanes 48 will strike the box vanes 78, as shown by an arrow 142, the air moving along a side wall 144 and exiting through an opening 146 as shown by an arrow 148, imparting a clockwise rotation to the outer turbine 75. Also shown in FIG. 7 are tube shaft strengthening means 68.

Referring to FIG. 2, there is shown a cross-sectional view of the generator along the lines 2—2 of FIG. 1. The tube shaft 60 is provided internally with a number of discs 150 which are spaced longitudinally along the tube shaft 60 to provide internal support. The discs 150 have punched-out areas 152.

As shown in FIG. 1, the inner turbine 56 and the outer turbine 75 are concentrically mounted with respect to each other and also are co-planar so that air moving along the spiral vanes 48 of the inner turbine 56 moves along a common plane to provide propulsion to the box vanes 78 of the outer turbine 75.

In interpreting the scope of the present invention, it will be appreciated that certain changes in details of construction may be made without departing from the scope of the invention. Accordingly, it will be understood that the embodiment, which has been described in detail, is presented for purposes of illustration and that the scope of the invention is defined only in terms of the appended claims.

What is claimed is:

1. Wind operated generator comprising a housing means having a shaft opening, outer turbine means having a shaft extending through said shaft opening, an inner turbine means coaxially and coplanarly arranged with respect to said outer turbine means, roller means for supporting said inner and outer turbine means with respect to each other and said housing, magnetic means supported by said inner and outer turbine means, roller ring means interposed co-axially between said inner and outer turbine means, and electromagnetic pick-up means juxtaposed to said magnetic means to provide an electrical output, said inner turbine means directing a coplanar flow of air to actuate said outer turbine means to rotate counter to the rotation of said inner turbine means.

2. An apparatus according to claim 1, said inner turbine means comprises a longitudinal tube shaft, a turbine secured to one end of the tube shaft, said magnetic means being mounted on the other end of said tube shaft.

3. An apparatus according to claim 1, said outer turbine means comprises a longitudinal tube shaft, a turbine secured to one end of the tube shaft, said magnetic means being mounted on the other end of said tube shaft.

4. An apparatus according to claim 1, said roller means comprises at least two pairs of roller cages, each roller cage having a plurality of rollers, one pair of roller cages being secured to said housing and adapted to provide external support to said outer turbine means, the other pair of cages being secured to the outer periphery of said inner turbine means.

5. An apparatus according to claim 1, said roller ring means comprises at least two ring plates, each ring plate having a plurality of rollers, a plurality of brackets, each supporting a respective roller outwardly of said ring plate, said rollers being aligned radially on said ring plate.

6. An apparatus according to claim 1, said magnetic means comprising one set of spaced magnets externally supported at one end of said outer turbine means, and another set of spaced magnets internally supported at one end of said inner turbine means.

7. An apparatus according to claim 1, said electromagnetic pick-up means comprises a plurality of coils spaced about the periphery of one end of said outer turbine means and a plurality of coils spaced in the interior of one end of said inner turbine means.

8. An apparatus according to claim 7, including support plate brackets circularly mounted on said support plate, each bracket supporting one of said coils spaced about the periphery of said outer turbine means, and a cylinder having one end peripherally supporting the coils associated with said inner turbine means.

9. An apparatus according to claim 1, said inner turbine means include a turbine having spiral vanes and said outer turbine means include a turbine having open-ended box-type vanes encompassing said spiral vanes.

10. An apparatus according to claim 1, including a rotatable base, and means for securing said housing to said base.

11. An apparatus according to claim 10, including a pedestal, a circular track secured on the top surface of said pedestal, said rotatable base being supported on said track via grooved rollers, and means for rotatably securing said base on said pedestal.

12. An apparatus according to claim 11, including a vane structure secured to said housing for directing the inner and outer turbine means into the direction of the wind.

* * * * *